United States Patent [19]

Schenk et al.

[11] Patent Number: 4,524,123

[45] Date of Patent: Jun. 18, 1985

[54] CHELATABLE 4-THIENYL IMIDAZOLE AZO DYES, THEIR USE IN COLOR PHOTOGRAPHIC RECORDING MATERIAL

[75] Inventors: Günther Schenk; Peter Bergthaller; Holger Heidenreich, all of Cologne; Gerhard Wolfrüm, Leverkusen, all of Fed. Rep. of Germany

[73] Assignee: Agfa-Gevaert Aktiengesellschaft, Leverkusen, Fed. Rep. of Germany

[21] Appl. No.: 593,936

[22] Filed: Mar. 27, 1984

[30] Foreign Application Priority Data

Apr. 7, 1983 [DE] Fed. Rep. of Germany ....... 3312500

[51] Int. Cl.³ .................... G03C 1/40; G03C 5/54
[52] U.S. Cl. .................................. 430/241; 430/222; 430/223; 430/242; 430/562
[58] Field of Search ............... 430/223, 226, 562, 241, 430/242, 222

[56] References Cited

U.S. PATENT DOCUMENTS 4,142,891 3/1979 Baigrie et al. ................ 430/223
4,396,710 8/1983 Bergthaller et al. ............ 430/223
4,418,143 11/1983 Bergthaller et al. ............ 430/223

*Primary Examiner*—Richard L. Schilling
*Attorney, Agent, or Firm*—Connolly and Hutz

[57] ABSTRACT

Azo dyes corresponding to the formula (II):

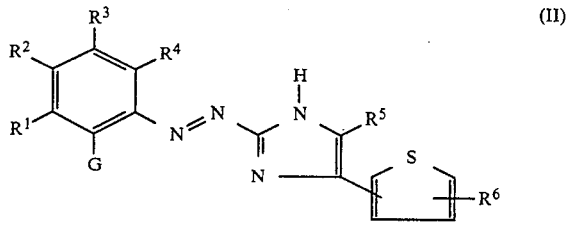

wherein G represents a group capable of forming a 5-membered chelate ring and $R^5$ represents aryl or a thienyl group, combined with metal ions, in particular copper or nickel ions, to form stable azo dye-metal complexes which have advantageous spectral properties. They are therefore particularly suitable for the production of highly light-fast cyan images, e.g. by the Ink-Jet process, in which they may be used directly in the form of colored inks, or by the dye diffusion transfer process, in which they are released image-wise from corresponding dye-releasers in the course of development and transferred to a dye-absorbent layer.

2 Claims, No Drawings

CHELATABLE 4-THIENYL IMIDAZOLE AZO DYES, THEIR USE IN COLOR PHOTOGRAPHIC RECORDING MATERIAL

This invention relates to new azo dyes which form stable cyan dye-metal complexes with heavy metal ions, and their use for the production of light-fast cyan images, e.g. by the Ink-Jet process or by the dye diffusion transfer process.

The invention further relates to a color photographic recording material for the production of color images by the dye diffusion transfer process, which material contains, in association with at least one light-sensitive silver halide emulsion layer, a non-diffusible, color providing compound from which a diffusible, complex-forming azo dye is released in the course of development.

The dye diffusion transfer process is based on the production of an image-wise distribution of diffusible dyes in a light-sensitive element in the course of development, this image-wise distribution being produced to an extent depending upon a preceding exposure and transferred to an image receptor element. It is known that, in some cases, the light fastness of the color images produced by such a process may be improved by using dyes capable of forming complexes with metal ions, e.g. tridentate azo dyes, which form stable dye-metal complexes with suitable metal ions in an after treatment. The effect achieved by complex formation with metal ions, namely improving the light-fastness of azo dye images which have been obtained by the dye diffusion transfer process or by some other photographic process, such as the silver dye bleaching process, has been disclosed, for example, in DE-B Nos. 1,116,532 and DE-B 1,125,279.

DE-A No. 2,740,719 describes non-diffusible, color providing compounds (dye-releasers) which release diffusible, metallizable azo dyes corresponding to the following formula (I) in the course of development:

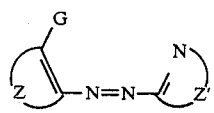

in which formula:
Z represents the atoms required for completing an aromatic, carboxylic or heterocyclic nucleus having at least one ring with 5 to 7 atoms,
Z' represents the atoms required for completing a heterocyclic ring, and
G represents a group required for forming a metal chelate.

If, in such dyes, the atoms symbolized by Z' complete a 2-amino-3-hydroxy pyridine group or a 4-hydroxy-isoquinoline group which is attached through the 1-position, the metal complex image dyes obtained after metallization with nickel or copper ions have a dull color tone which is in no way comparable to that obtained with the known cyan image dyes such as phthalocyanine dyes or 4-(4-nitrophenylazo)-1-naphthol dyes. The loss in quality vitiates the advantage of rapid diffusion or increased light-fastness and stands in the way of any technical utilization.

Even more inhibiting is the disadvantage of the unfavourable absorption characteristics of the 2-(5-nitro-2-pyridylazo)-1-naphtols also mentioned in DE-A No. 2,740,719 as well as in U.S. Pat. Nos. 4,147,544 and 4,165,238 and the 2-(5-sulfamoyl-2-pyridylazo)-4-alkoxy-1-naphthols and 2-(benzothiazolylazo)-1-naphthols mentioned in U.S. Pat. Nos. 4,204,870 and 4,207,104, which have such high side densities in the wave-length region of blue light that they are to be regarded as so called "untrue" cyan dyes.

It is an object of the present invention to prepare after-metallizable mono-azo dyes which are distinguished by the exceptionally clear cyan color tones of the copper complexes obtained from them and by their exceptionally high light-fastness.

It has been found that this problem may be solved by a special formation of chromophore (Ia) which has already been described as advantageous in DE-A No. 2,740,719:

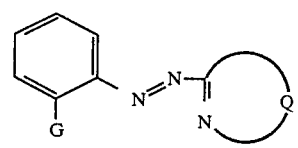

wherein Q represents the components for completing a 4-thienyl imidazole ring.

The invention relates to new azo dyes corresponding to formula (II) shown below and their metal complexes.

The invention also relates to the use of the dyes corresponding to formula (II) for the production of light-fast cyan images, e.g. by the Ink-Jet process or by the dye diffusion transfer process.

A further object of this invention is a color photographic recording material for the production of color images by the dye diffusion transfer process, which material contains, in association with at least one light-sensitive silver halide emulsion layer, a non-diffusible, color-providing compound (dye-releaser) from which a diffusible azo dye capable of forming complexes with metal ions is released under the conditions of alkaline development as a function of the development of the silver halide emulsion layer, characterized in that the azo dye corresponds to formula (II).

The invention finally also relates to a color image consisting of an image-wise distribution of a cyan dye on a layer support, characterized in that the cyan dye is a copper complex of an azo dye corresponding to formula (II):

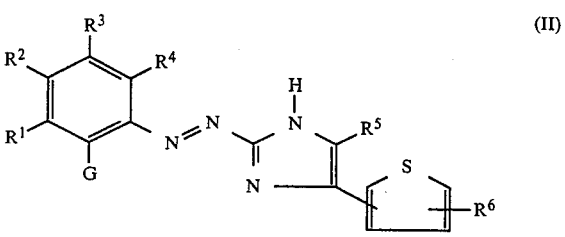

In the above formula (II),
$R^1$, $R^2$, $R^3$ and $R^4$, which may be identical or different, represent H, F, Cl, Br, —CN, —NO$_2$, —CF$_3$, —OCF$_3$, —SCF$_3$, alkyl, alkoxy, alkylthio, acylamino, alkylsulfonyl, arylsulfonyl, —CO—X or —SO$_2$Y; or
$R^3$ and $R^4$ together represent a group for completing a 1,3-oxathiol-S,S-dioxide ring,
$R^5$ represents aryl, in particular phenyl, or a 2-thienyl or 3-thienyl group, $R^6$ represents hydrogen, halogen, in particular chlorine, or alkyl, G represents a group capable of forming a 5-membered chelate ring, X represents —OH, alkoxy, an amino group optionally substituted by alkyl or aryl, or a cyclic amino group, Y represents H, —OH, an amino group optionally substituted by alkyl or aryl, a cyclic amino group, or a group of the formula —NH—SO$_2$—R$^7$, and R$^7$ represents alkyl, aryl, an amino group optionally di-substituted by alkyl, or a cyclic amino group.

Group G capable of forming a 5-membered chelate ring is a group which actively participates in the formation of an azo dye (tridentate)-metal complex in the presence of metal ions, a 5-membered ring being formed with the inclusion of group G, a metal atom and the nitrogen atom of the azo group adjacent to group G.

Examples of suitable groups capable of forming a 5-membered chelate ring include the following groups, which optionally are present in an acylated form cleavable by alkali:

OH and —NH—SO$_2$—R$^8$, wherein R$^8$ has one of the meanings indicated for R$^7$.

The alkyl groups optionally present in the groups mentioned in the definitions for R$^1$ to R$^7$ preferably do not contain more than 4 carbon atoms. Preferred examples are: methyl, ethyl, n-propyl, isopropyl and n-butyl.

The aryl groups mentioned in the definitions for R$^1$ to R$^5$ and R$^7$ are preferably phenyl groups. They may be further substituted, e.g. by halogen, alkyl, alkoxy, acylamino, sulfamoyl or sulfinate, but they preferably do not contain more than 10 carbon atoms, including those present in the substituents.

An aryl group represented by R$^5$ may be, for example, a phenyl, p-tolyl, p-chlorophenyl or p-anisyl group. A thienyl group represented by R$^5$ may be further substituted, e.g. by one or two of the groups mentioned under R$^6$. Such groups are preferably situated in the 2- or 5-position of the thienyl group.

The cyclic amino groups mentioned above are 5- to 7-membered cyclic amino groups, e.g. the pyrrolidine, piperidine or morpholine group.

Acyl groups (acylamino) are generally derived from aliphatic or aromatic carboxylic or sulfonic acids, carbamic acids or sulfamic acids or carbonic acid semi-esters. Hydrolysable acyl groups in the group G which is capable of forming a 5-membered chelate ring are in particular derived from aliphatic carboxylic acids or carbonic acid semi-esters.

Preferred dyes are those in which R$^1$ and R$^3$ are either both electronegative substituents with metasigma value $\sigma_m$ (according to D. H. McDaniel and H. C. Brown in J. Org. Chem. 23, 420 et seq (1958)) corresponding to at least one of the following two terms:

$\sigma_m(R^1), \sigma_m(R^3) \geqq +0.33$     1.

$\sigma_m(R^1) + \sigma_m(R^3) \geqq +0.75$     2.

or R$^1$ is an electronegative substituent having a $\sigma_m$ value $\geqq +0.33$ and R$^3$ stands for —SO$_2$Y.

Those dyes in which R$^1$ is a nitro group are particularly preferred.

The particulars given above completely describe the chromophore system which is responsible for the spectral properties of the azo dyes according to the invention and their metal complexes. The dyes may in addition contain other suitable substituents to adapt them to special purposes. Thus, dyes of formula (II) used in the dye diffusion transfer process may contain suitable functional groups to provide them with suitable diffusion and mordanting characteristics. These groups may be, for example, in the form of some of the groups R$^1$ to R$^8$ already mentioned above or in the form of substituents optionally attached to one of the said groups through a suitable linking member and may consist, for example, of anionic or anionisable groups such as sulfonate, sulfinate, phenolate, carboxylate, disulfimide or sulfamoyl groups or a functional group resulting from the breaking of a bond of attachment to a carrier group carrying a ballast group, such a functional group being characteristic of the nature of the carrier group and the bond. The last mentioned functional group may be identical with the modifying groups mentioned above which modify the diffusion and mordanting characteristics. It may be attached, for example, to an alkyl, hetaryl or aryl group, which in turn may form part of one of the substituents mentioned under R$^1$ to R$^8$.

According to DE-A No. 2,740,719, the heterocyclic nucleus completed by Z' (see formula I) may be a 4,5-diphenyl-imidazole group. The corresponding dyes contain a phenyl group in place of the thienyl group shown in formula (II) as well as in place of R$^5$, and they form violet to blue complexes with nickel or copper-II ions. According to the present invention, replacement of one of the two phenyl groups on the imidazole ring by a thienyl group produces a bathochromic shift in the color shade of the complexes without an increase in the subsidiary densities. Furthermore, it is found that the complexes obtained, in particular the copper-II complexes, give rise to cyan image dyes which have exceptionally high light-fastness.

One characteristic of the new dyes of formula (II) according to the invention is that the absorption spectra of the dyes are shifted in the direction of shorter wave lengths compared with those of the complexes. An alkalilabile blocking of the chelate-forming group G by acyl groups or related protective groups is not necessary for this purpose but acylation causes a further shift in the absorption of the chromophore towards shorter wave lengths. In addition, the color intensity is reduced, with the result that the absorption of the layer containing the non-diffusible color-providing compound does not impair the sensitization of the associated silver halide emulsion layer by a filter effect.

In the case of the dye diffusion transfer process, formula (II) refers to the diffusible dyes released according to the invention in the course of development. These dyes are released from non-diffusible, color-providing compounds (dye-releasers) incorporated in the layer. These are compounds in which a dye residue corresponding to formula (II) is attached to a carrier group CAR containing at least one ballast group, optionally with interposition of a suitable linking member.

The dye corresponding to formula (II) may be attached to the carrier group by, for example, one of the substituents R$^1$ to R$^6$ or by the group G. The dye-releaser according to this invention may therefore be represented by the following formula (III):

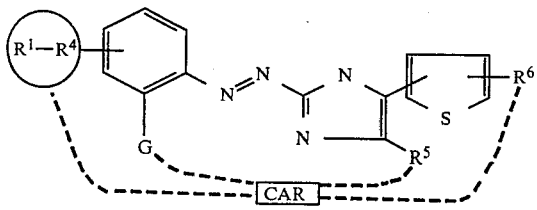

wherein $R^1$ to $R^6$ and G have the meanings already indicated,

CAR denotes a carrier group containing at least one group which confers diffusion resistance, and the broken lines indicate possible linkage points. The dye-releasers of formula (III) according to the invention therefore contain the carrier group as a substituent in one of the groups represented by $R^1$ to $R^6$ and G.

In addition to containing the group which confers diffusion resistance, the carrier group represented by CAR contains at least one group which is capable of being released as a function of the development of a silver halide emulsion layer so that the dye attached to the carrier group is separated from the group conferring diffusion resistance, optionally together with a small fragment of the original carrier group, and may thus be released from its attachment to the layer. The carrier groups may have various structures depending upon the mode of functioning of the releasable group.

The dye-releasers according to this invention may be, for example, non-diffusible couplers containing, in the coupling position, a dye residue according to the present invention, which they release as a result of chromogenic coupling. Such releasing mechanisms have been described, for example, in DE-C No. 1,095,115 and in U.S. Pat. No. 3,227,550.

Redox-active dye-releasers corresponding to the following formula have proved to be particularly advantageous:

BALLAST—REDOX—DYE wherein

BALLAST denotes a ballast group, i.e. a group conferring diffusion resistance,

REDOX denotes a redox-active group, i.e. a group which is capable of being oxidized or reduced under alkaline development conditions and which, depending upon whether it is in the oxidized or reduced state, can undergo an elimination reaction, a nucleophilic displacement reaction or hydrolysis to varying extents, with the result that the DYE residue is split off, and DYE denotes the residue of a diffusible dye, in the present case a dye corresponding to formula (II).

Ballast groups are in this case groups which enable the dye-releaser according to the invention to be incorporated in a diffusion-fast form in the hydrophilic colloids conventionally used in photographic materials. Particularly suitable for this purpose are organic groups generally containing straight-chained or branched aliphatic groups having generally from 8 to 20 carbon atoms and optionally also containing carbocyclic or heterocyclic, optionally aromatic groups. These ballast groups are attached to the remainder of the molecule either directly or indirectly, e.g. through one of the following groups: —NHCO, —NHSO$_2$—, —NR—

(wherein R represents hydrogen or alkyl), —O— or —S—. The ballast group may in addition contain groups conferring solubility in water, e.g. sulfo groups or carboxyl groups, and these may also be present in an anionic form. Since the diffusion characteristics depend upon the molecular size of the whole compound used, it is in some cases sufficient, e.g. if the molecule as a whole is large enough, to use short-chained groups as ballast groups.

Redox-active carrier groups having the structure BALLAST-REDOX- and suitable dye-releasers are known in various forms.

Oxidizable dye-releasers which in their oxidized form undergo hydrolysis to release a diffusible dye have been described, for example, in DE-A Nos. 2,242,762, DE-A 2,406,664, DE-A 2,505,246, DE-A 2,613,005, DE-A 2,645,656 and the following Research Disclosure publications: No. 15,147 (November 1976), No. 15,654 (April 1977), No. 17,736 (January 1979). These dye-releasers are mainly compounds in which a dye residue is attached to an oxidizable carrier group through a sulfonamide group. The dye released on development therefore contains a sulfamoyl group.

Oxidizable dye-releasers which in their oxidized form undergo an intramolecular displacement reaction to release a diffusible dye have been disclosed, for example, in U.S. Pat. No. 3,443,940. The dyes released from these compounds contain sulfinate groups.

Below are given examples of oxidizable carrier groups which in their oxidized form release a dye residue attached to them:

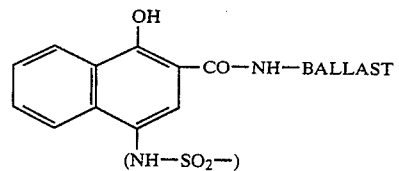

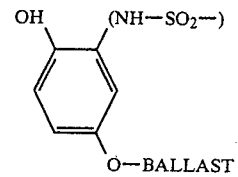

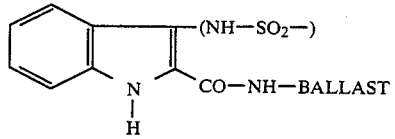

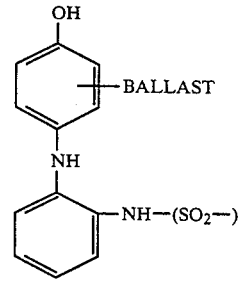

The groups shown in brackets are released together with the dye residue and remain with the dye as functional groups, optionally attached to the dye through an intermediate member.

In the types of dye-releasers mentioned so far, the dyes are released in proportion to the rate of formation of an oxidation product by silver halide development or by catalytic reinforcement, e.g. with $H_2O_2$. This process therefore operates on the principle of a negative process so that the production of positive images requires reversal, e.g. by using direct positive emulsions or an arrangement of layers operating on the principle of the silver salt diffusion process.

It is particularly advantageous if the carrier group containing a ballast group and a redox moiety is so constituted that the diffusible azo dye is released under alkaline conditions approximately in inverse ratio to the state of development of the silver halide layer. Such a system is positive from the start and suitable for the production of positive images using conventional negative silver halide emulsions. Dye-releasers of this kind are also known and will be described below.

Oxidizable dye-releasers which are stable in their oxidized form but undergo an intramolecular nucleophilic displacement reaction in their reduced form to release a dye residue have been disclosed, for example, in DE-A Nos. 2,402,900 and DE-A 2,543,902.

Oxidizable dye-releasers which are stable in their oxidized form but undergo an elimination reaction in the reduced form to release the dye have been described in DE-A Nos. 2,823,159 and DE-A 2,854,946.

The activity of the last two mentioned groups of dye-releasers may be reversed by using such compounds not in their reduced form but in their oxidized form. The types of dye-releasers mentioned below are obtained in this way.

Reducible dye-releasers which, after reduction, undergo an intramolecular nucleophilic displacement reaction to release a dye residue have been disclosed in DE-A No. 2,809,716. These compounds are described as so called BEND compounds (BEND = Ballasted Electron-accepting Nucleophilic Displacement).

Reducible dye-releasers which after reduction undergo an elimination reaction to release a dye have been disclosed in EP-A No. 0,004,399 and GB-A No. 80 12 242.

Other classes of reducible dye-releasers which undergo reductive decomposition by similar reaction mechanisms to release dyes have been disclosed in DE-A Nos. 3,008,588 and DE-A 3,014,669.

Examples of reducible carrier groups from which a dye residue attached thereto is released under reducing conditions are shown below:

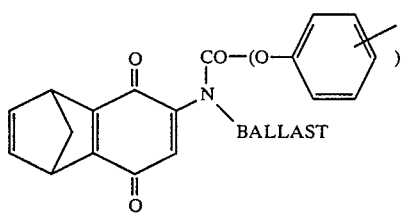

-continued

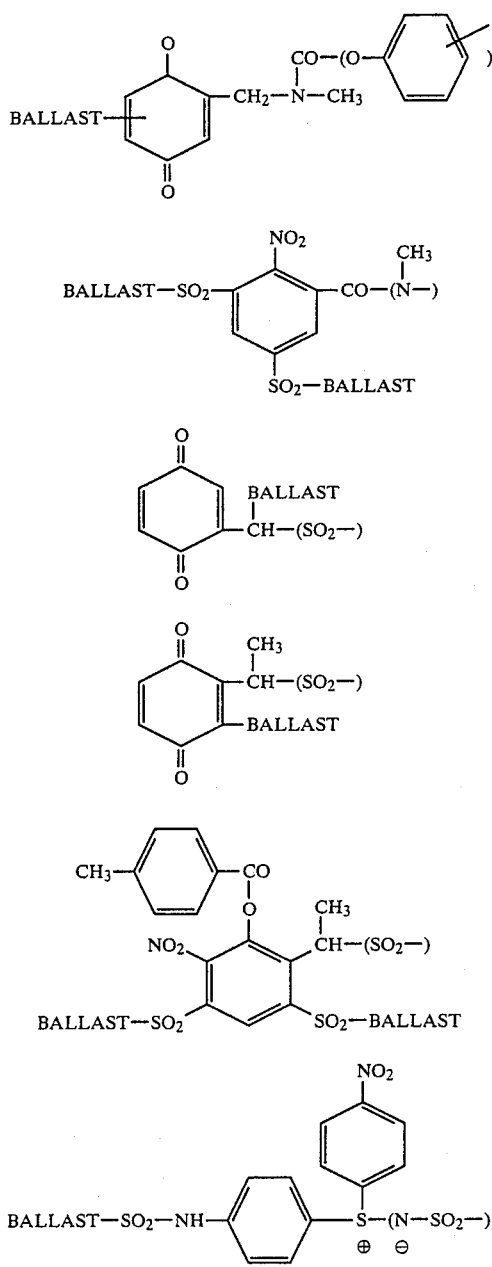

The groups shown in brackets are functional groups of the dye residue and remain with the dye residue on separation from the remaining part of the carrier group. The functional group may be one of the substituents mentioned in the definition of groups $R^1$ to $R^8$ in formula (II), which may exert a direct influence on the absorption and complex-forming characteristics of the dyes of formula (II) according to the invention. Alternatively, the functional group may be separated from the chromophore of the dye according to the invention by an intermediate member in that it may be present as a substituent in one of the groups $R^1$ to $R^8$ without necessarily having any influence on the absorption and complex-forming characteristics. The functional group may, however, play a significant role together with the intermediate member in affecting the diffusion and mordanting characteristics of the dyes according to the invention. Alkylene and arylene groups, for example, may be suitable intermediate members.

The last-mentioned classes of reducible dye-releasing compounds which may be split by reduction are suitably used in combination with so-called electron donor compounds (ED compounds). The latter function as reducing agents which are consumed image-wise in the course of development of the silver halide, the unused portion reducing the associated dye-releaser thereby releasing the dye. Examples of suitable ED compounds include non-diffusible or only slightly diffusible derivatives of hydroquinone, of benzisoxazolone, of p-aminophenol or of ascorbic acid (e.g. ascorbyl palmitate), which have been described, for example in DE-A No. 2,809,716. Particularly suitable ED compounds form the subject matter of DE-A No. 3,006,268.

Examples of suitable ED compounds are shown below.

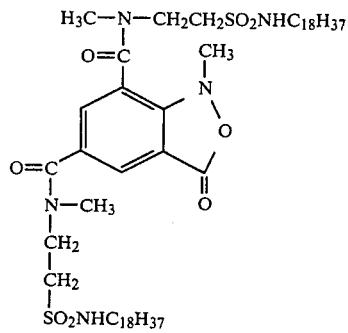 ED 1

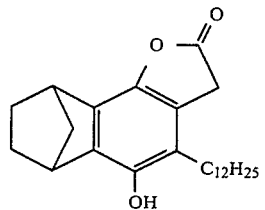 ED 2

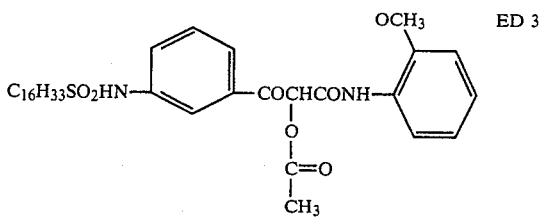 ED 3

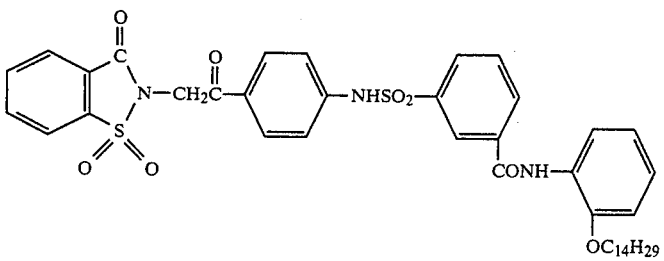 ED 4

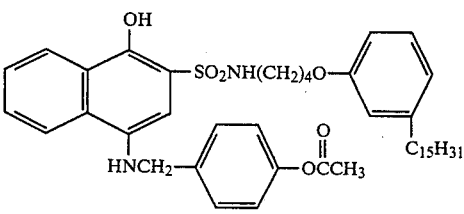 ED 5

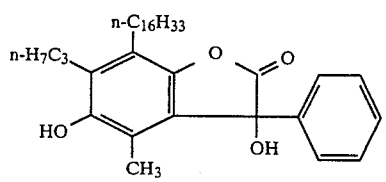 ED 6

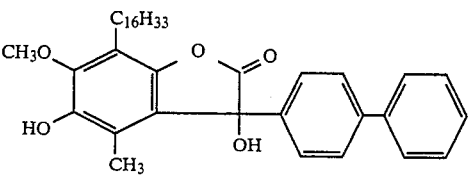 ED 7

Examples of monoazo dyes according to the invention corresponding to Formula (II) which may be metallized to form cyan copper complexes with advantageous absorption characteristics and excellent light fastness are shown below.

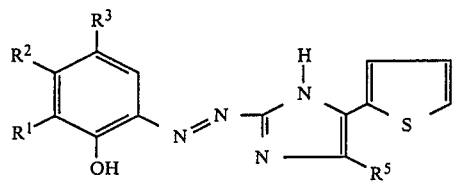

| Dye | R¹ | R² | R³ | R⁵ |
|---|---|---|---|---|
| 1 | —NO$_2$ | H | —SO$_2$N(CH$_3$)$_2$ | Phenyl |
| 2 | —NO$_2$ | H | —SO$_3$H | Phenyl |
| 3 | —SO$_3$H | H | Cl | Phenyl |
| 4 | Cl | H | —SO$_3$H | Phenyl |
| 5 | Cl | H | —NO$_2$ | Phenyl |
| 6 | H | —SO$_3$H | Cl | Phenyl |
| 7 | —NO$_2$ | H | —SO$_2$NH$_2$ | Phenyl |
| 8 | —NO$_2$ | H | Cl | Phenyl |
| 9 | —NO$_2$ | H | —SO$_2$NH-(2-COOH-C$_6$H$_4$) | Phenyl |
| 10 | —NO$_2$ | H | —SO$_2$N(CH$_3$)$_2$ | p-Tolyl |
| 11 | —NO$_2$ | H | —SO$_3$H | p-Tolyl |
| 12 | —NO$_2$ | H | —SO$_2$—N(CH$_3$)-(2-COOH-C$_6$H$_4$) | p-Tolyl |
| 13 | Cl | H | —SO$_3$H | p-Tolyl |
| 14 | H | —SO$_2$NH-(2-COOH-C$_6$H$_4$) | Cl | p-Tolyl |
| 15 | —NO$_2$ | H | —SO$_2$NH | p-Tolyl |
| 16 | H | H | —NO$_2$ | p-Tolyl |
| 17 | —NO$_2$ | H | Cl | p-Tolyl |
| 18 | H | —NO$_2$ | Cl | p-Tolyl |
| 19 | —NO$_2$ | H | —SO$_2$—NH-(2-OCH$_3$-5-SO$_2$NH$_2$-C$_6$H$_3$) | p-Tolyl |
| 20 | —NO$_2$ | H | —SO$_2$NH-(4-Cl-2-COOH-C$_6$H$_3$) | p-Tolyl |

-continued

| | | | | |
|---|---|---|---|---|
| 21 | —NO₂ | H | 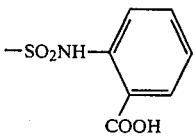—SO₂NH—(C₆H₄)—COOH | p-Tolyl |
| 22 | —NO₂ | H | —SO₂H | p-Tolyl |
| 23 | —NO₂ | H | 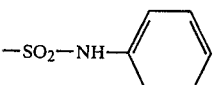—SO₂—NH—Ph | p-Tolyl |
| 24 | —NO₂ | H | 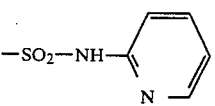—SO₂—NH-(2-pyridyl) | p-Tolyl |
| 25 | —NO₂ | H | 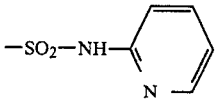—SO₂—NH-(2-pyridyl) | Phenyl |
| 26 | —NO₂ | H | 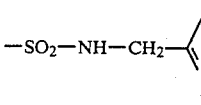—SO₂—NH—CH₂-(2-pyridyl) | p-Tolyl |
| 27 | —NO₂ | H | —SO₃H | p-Cl—Phenyl |
| 28 | Cl | H | —SO₃H | p-Cl—Phenyl |
| 29 | H | —SO₃H | Cl | p-Cl—Phenyl |
| 30 | —NO₂ | H | 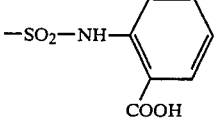—SO₂—NH—(C₆H₄)—COOH | p-Cl—Phenyl |
| 31 | —NO₂ | H | 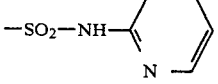—SO₂—NH-(2-pyridyl) | p-Cl—Phenyl |
| 32 | —NO₂ | H | —SO₃H | 2-Thienyl |
| 33 | H | —SO₃H | Cl | 2-Thienyl |
| 34 | —NO₂ | H | 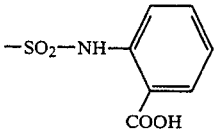—SO₂—NH—(C₆H₄)—COOH | 2-Thienyl |
| 35 | —NO₂ | H | 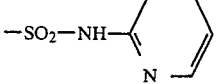—SO₂—NH-(2-pyridyl) | 2-Thienyl |
| 36 | —NO₂ | H | 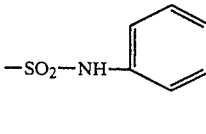—SO₂—NH—(C₆H₃)(CH₃)(SO₂H) | p-Tolyl |
| 37 | —NO₂ | H | 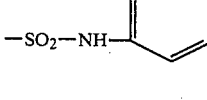—SO₂—NH—(C₆H₃)(OCH₃)(SO₂H) | p-Tolyl |

-continued

| | | | | |
|---|---|---|---|---|
| 38 | —NO₂ | H | —SO₂—NH—⌬—SO₂NH₂ (3-sulfamoylphenyl) | p-Tolyl |
| 39 | —NO₂ | H | —CF₃ | 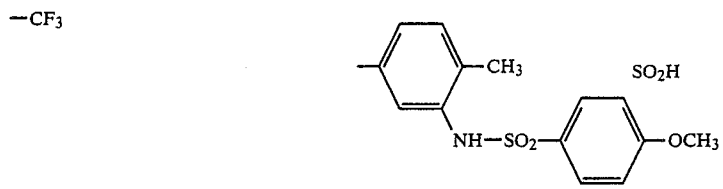 |
| 40 | —NO₂ | H | —SO₂—NH—Ph | 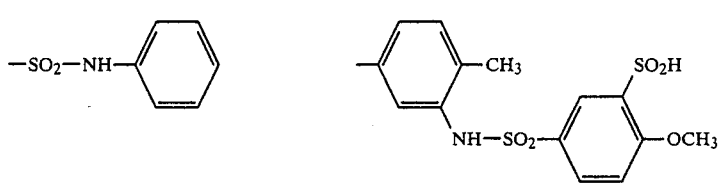 |

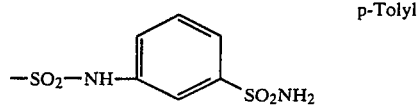

| Dye | R¹ | R³ | R⁵ | Thienyl |
|---|---|---|---|---|
| 41 | —NO₂ | —SO₃H | Phenyl | 5-Cl—2- |
| 42 | —NO₂ | —SO₃H | p-Tolyl | 5-Cl—2- |
| 43 | —NO₂ | —SO₃H | Phenyl | 2,5-dimethyl-3- |
| 44 | —NO₂ | —SO₃H | p-Tolyl | 2,5-dimethyl-3- |
| 45 | —NO₂ | —SO₂—NH—(2-pyridyl) | p-Tolyl | 5-Cl—2- |
| 46 | —NO₂ | —SO₂—NH—(2-pyridyl) | Phenyl | 2,5-dimethyl-3- |
| 47 | —NO₂ | —SO₂—NH—(2-pyridyl) | p-Tolyl | 2,5-dimethyl-3- |
| 48 | —NO₂ | —SO₂—NH—(2-COOH-phenyl) | p-Tolyl | 2,5-dimethyl-3- |
| 49 | —SO₃H | Cl | p-Tolyl | 5-Cl—2- |
| 50 | —SO₃H | Cl | p-Tolyl | 2,5-dimethyl-3- |
| 51 | —NO₂ | —SO₃H | p-Tolyl | 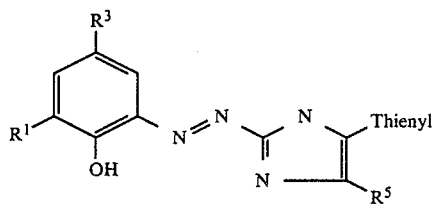 |

-continued
| | | | | |
|---|---|---|---|---|
| 52 | —NO₂ | 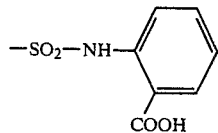 | p-Tolyl | 5-(SO₃H)—2- |
| 53 | —NO₂ | 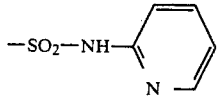 | p-Tolyl | 5-(SO₃H)—2- |
| 54 | —NO₂ | 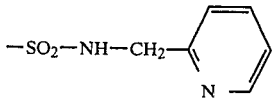 | p-Tolyl | 5-(SO₃H)—2- |
| 55 | —NO₂ | 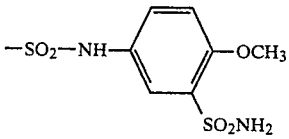 | p-Tolyl | 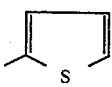 |
| 56 | —NO₂ | Cl | p-Tolyl | 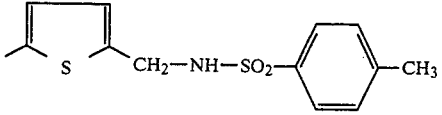 |
| 57 | —NO₂ | Cl | p-Tolyl | 5-(SO₃H)—2- |
| 58 | —NO₂ | 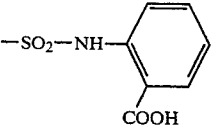 | p-Tolyl | 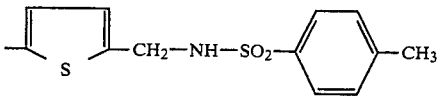 |
| 59 | —NO₂ | 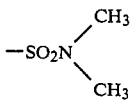 | p-Tolyl | 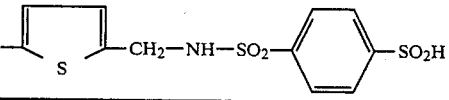 |
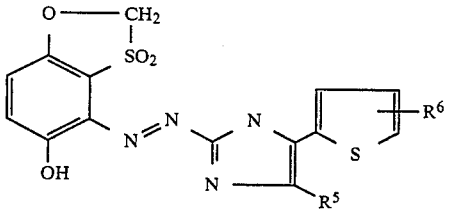
| Dye | R⁵ | R⁶ |
|---|---|---|
| 60 | p-Tolyl | H |
| 61 | Phenyl | H |
| 62 | Thienyl | H |
| 63 | p-Tolyl | 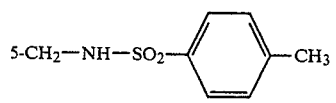 |
| 64 | p-Tolyl | 5-SO₃H |
Preparation of the dyes is carried out in known manner by the coupling of diazotized amines corresponding to formula (IV):

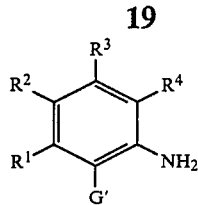

wherein $R^1$, $R^2$, $R^3$ and $R^4$ have the meanings indicated above and G' stands for G or a group which is replaceable by G, e.g. halogen or $-OSO_3^{\ominus}$, in an aqueous, organic or aqueous-organic medium with coupling components corresponding to formula (V):

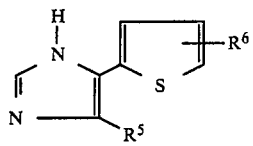

wherein $R^5$ and $R^6$ have the meanings already indicated.

The following are examples of suitable diazo components (IV): 4,6-dichloro-2-aminophenol, 4-nitro-2-aminophenol, 5-nitro-2-aminophenol, 4,6-dinitro-2-aminophenol, 4-chloro-5-nitro-2-aminophenol, 4-chloro-6-nitro-2-amino-phenol, 6-chloro-4-nitro-2-aminophenol, 6-nitro-2-amino-4-acetyl-aminophenol, 5-nitro-3-amino-4-hydroxy-toluene, 3-amino-4-hydroxy-toluene-5-sulfonic acid, 6-chloro-2-aminophenol-4-sulfonic acid amide, 6-nitro-2-aminophenol-4-sulfonic acid, 6-nitro-2-aminophenol-4-sulfonic acid amide, 2-aminophenol-5-sulfonic acid, 2-aminophenol-5-sulfonic acid amide, 2-aminophenol-5-sulfonic acid dimethylamide, 2-aminophenol-5-sulfonic acid morpholide, 4-chloro-2-aminophenol-5-sulfonic acid, 4-chloro-2-aminophenol-5-sulfonic acid amide, and 4-amino-5-hydroxy-1,3-benzoxathiol-3,3-dioxide. Other suitable diazo components (IV) are described in DE-A No. 3,107,540.

The following are examples of suitable coupling components V: 4-(2-thienyl)-5-phenylimidazole, 4-(2-thienyl)-5-p-tolylimidazole, 4-(2-thienyl)-5-p-anisylimidazole, 4-(2-thienyl)-5-p-chlorophenyl imidazole, 4-(2-thienyl)-5-p-carboxymethoxy-phenyl imidazole, 4-(2-thienyl)-5-p-sulfomethoxy-phenyl imidazole, and 4,5-bis-(2-thienyl)imidazole.

Preparation of the 4-(thienyl)-imidazoles is carried out by the known methods of formamide cyclization of 2-(α-halogen acyl)-thiophenes, 3-(α-halogen acyl)-thiophenes, 2-(α-hydroxy acyl)-thiophenes or thienoines, e.g. mixed thienoines at temperatures in the reagion of 150°–200° C., as described by Bredereck et al. in Angew Chem. 71, 753 (1959).

The process has also been described in U.S. Pat. No. 4,199,592.

References may also be found in the publications by A. J. Hill and R. A. Brooks in J. Org. Chem. 23, 1289 [1958]: by Gronowitz et al in Acta Chem. Scand. 20, 1577 [1966] and by H. D. Hartough in J. Amer. Chem. Soc. 69, 3093 [1947].

The methods of preparation of the dyes according to the invention are described below with reference to some representative examples.

Dye 2

7.3 g of 3-amino-4-hydroxy-5-nitrobenzene sulfonic acid were dissolved in 50 ml of water and 5 ml of sodium hydroxide solution. After the addition of 2.1 g of $NaNO_2$, the resulting solution was stirred into a mixture of 50 g of ice and 20 ml of hydrochloric acid. After 45 minutes stirring at 0° C., the nitrite excess was destroyed by means of amidosulfonic acid.

The diazonium salt solution was added at 0° C. to a mixture of 6.55 g of 4-thienyl-5-phenyl-imidazole and 30 ml of dimethyl formamide (DMF) while the pH was maintained at 13 by means of NaOH. After complete coupling, the reaction mixture was acidified and the dye was isolated in the form of a red powder.

Yield: 13.2 g.

Dye 9

3.53 g of 2-(3-amino-4-hydroxy-5-nitrophenylsulfonylamino)-benzoic acid were dissolved in 30 ml of water and 5 ml of sodium hydroxide solution. After the addition of 0.85 g of $NaNO_2$, the dark red solution obtained was stirred into a mixture of 50 g of ice and 11 ml of concentrated hydrochloric acid. Diazotization was completed after 45 minutes. The nitrite excess was destroyed with amidosulfonic acid and the yellow solution was added at 0° C. to a solution of 2.26 g of 4-thienyl-5-phenyl-imidazole in 50 ml of pyridine and 15 ml of concentrated sodium hydroxide solution. The dye was obtained after 30 minutes by acidification.

Yield: 5.4 g of dark red powder.

Dye 11

The diazonium salt solution obtained by the method described for Dye 2 is run into a mixture of 6.96 g of 4-thienyl-5-tolyl-imidazole in 30 ml of DMF at 0° C. while the pH is maintained at 13 by means of NaOH. After complete coupling, 14.0 g of dye are isolated by acidification.

Dye 15

1.15 g of 6-nitro-2-aminophenol-4-sulfonamide (0.005 mol) in 20 ml of water and 1.5 ml of concentrated hydrochloric acid are diazotized with 0.35 g of sodium nitrite in 1.5 ml of water at 0°–5° C.

The reaction mixture is stirred for a further 30 minutes at 5° C., any nitrile still present is destroyed with 0.1 g of amidosulfonic acid, and the suspension is introduced into a mixture of 1.2 g of 4-(2-thienyl)-5-p-tolyl imidazole and 3.5 g of potassium carbonate in 40 ml of methanol.

The potassium carbonate dissolves almost completely when coupling sets in. The reaction mixture is stirred for a further 4 hours, and the precipitated dye is suction-filtered, washed with 5% sodium chloride solution and dried.

Yield: 1.85 g of blue-violet powder.

Dye 21

3.53 g of 2-(3-amino-4-hydroxy-5-nitrobenzene-sulfonylamino-benzoic acid were diazotized by the method described above for Dye 9. The diazonium salt solution was added at 0° C. to a mixture of 2.4 g of 4-thienyl-5-(4-methylphenyl)-imidazole in 50 ml of pyridine and 15 ml of concentrated sodium hydroxide solution. Coupling was completed after 45 minutes. 50 g of ice were added to the reaction mixture and the dye was subsequently precipitated all at once by acidification with concentrated hydrochloric acid. 5.5 g of a dark red powder were isolated.

Dye 22

(a) 27 g of 7-nitro-2-methylbenzoxazole-5-sulfochloride were introduced at 10° C. into 270 ml of ethanol and 12.5 g of hydrazine hydrate. After the upper layer constituting the ethanol phase had been decanted off, the sediment at the bottom was stirred up with 200 ml of water and suction-filtered. The filtrate was suspended in 20 ml of 40% NaOH and diluted with 50 ml of water. As soon as evolution of $N_2$ ceased, the solution was adjusted to pH=1 with 10% hydrochloric acid. The precipitated product was suction filtered and dried under vacuum.

Yield: 10 g of 2-amino-6-nitrophenol-4-sulfinic acid.

(b) The suspension of 1.1 g of 6-nitro-2-aminophenol-4-sulfonic acid in 15 ml of $H_2O$ and 1.5 ml of concentrated hydrochloric acid was diazotized at 0° to 5° C. with a solution of 0.35 g of $NaNO_2$ in 1.5 ml of $H_2O$, the mixture was stirred for 30 minutes, 0.1 g of amidosulfonic acid was added and the whole reaction mixture was introduced into a mixture of 1.2 g of 4-(2-thienyl)-5-p-tolyl imidazole and 4 g of potassium carbonate in 30 ml of methanol. Stirring was then continued for 3 hours at 5° C., the reaction mixture was adjusted to pH=1 with 15% hydrochloric acid, and the precipitated dye was suction-filtered, washed with water and dried.

To purify the brownish-red crude product obtained, it was dissolved in 25 ml of methyl glycol and adsorbed on 20 g of silica gel. After drying under vacuum, the product was applied to a chromatographic column with 400 g of silica gel 60 (Merck, 63–200 μm) and eluted with a mixture of methylethyl ketone, diethylamine and 5 N $NH_3$ in a volumetric ratio of 5:1:1.

Yield after concentration of the main fraction by evaporation: 0.4 g of pure dye.

Dye 30

2.5 g of 2-(3-amino-4-hydroxy-5-nitrobenzene-sulfonyl amino)-benzoic acid were diazotized by the method described for Dye 9 and coupled with 1.82 g of 4-thienyl-5-(4-chlorophenyl)-imidazole in 70 ml of pyridine and 13 ml of sodium hydroxide solution at 0° C. After 45 minutes, hydrochloric acid was added until the congo red reaction for acid was obtained, and the precipitated dye was then suction-filtered.

Yield: 4.0 g of dark red powder.

2-(3-amino-4-hydroxy-5-nitrobenzene-sulfonyl amino)-benzoic acid used as starting material was prepared as follows:

50 g of acetic acid anhydride were added to 46.8 g of 2-amino-6-nitrophenol-4-sulfonic acid (0.2 mol) in 600 ml of pyridine on a steam bath with stirring. The reaction mixture was stirred for a further 30 minutes and then suction-filtered after it had been cooled to room temperature. The crude diacetyl compound was mixed at 60° C. with 90 g of phosphorus pentachloride with stirring for 1 hour and then poured out on 400 g of ice after cooling. The precipitate was isolated by suction filtration and the sulphochloride obtained was recrystallized from acetonitrile.

Yield: 44.5 g.

For the reaction to produce the sulfonamide, 38.7 g of anthranilic acid in 150 ml of pyridine were introduced into a reaction vessel at 30° C., and 78 g of the sulfochloride prepared as described above were introduced portionwise. The reaction mixture was then stirred for 5 hours at 40° C. and the cooled solution obtained was poured onto a mixture of ice and hydrochloric acid. The product was suction-filtered at pH 1 and then treated with 300 ml of 15% sodium hydroxide solution at 100° C. After 11 hours, the reaction mixture was acidifed and the product was suction-filtered. The product crystallized from glacial acetic acid in the form of yellow crystals.

Yield: 69.5 g.

Dye 34

3.53 g of 2-(3-amino-4-hydroxy-5-nitrobenzene-sulfonylamino)-benzoic acid were dissolved in 30 ml of water with the addition of sodium hydroxide solution until the reaction was slightly alkaline. 0.8 g of sodium nitrite were added and diazotization was then carried out in a mixture of 50 g of ice and 7 ml of concentrated hydrochloric acid. After 45 minutes, the nitrite excess was destroyed by the addition of amidosulfonic acid, and the diazonium salt solution was added to an ice-cold mixture of 2.32 g of 4,5-bis-thienyl-imidazole in 50 ml pyridine and 10 ml of 40% sodium hydroxide solution. After 45 minutes, the reaction mixture was acidified and the precipitated dye was suction-filtered.

Yield: 5.3 g of dark red powder.

Dye 61

2.01 g of 4-amino-5-hydroxy-1,3-benzoxathiol-3,3-dioxide were dissolved in 20 ml of water and 1 ml of 40% sodium hydroxide solution. After the addition of 0.75 g of sodium nitrate, the solution was poured out onto a mixture of 50 g of ice and 15 ml of concentrated hydrochloric acid. The nitrite excess was removed by the addition of amidosulphonic acid after 45 minutes, and the diazonium salt solution was added to an ice-cold solution, adjusted to pH 13, of 2.26 g of 4-thienyl-5-phenyl imidazole in 50 ml of DMF. After coupling had been completed at pH=13, the reaction mixture was adjusted to pH 3.5 and suction-filtered.

Yield: 4.1 g of reddish-blue powder.

The dyes according to the invention may be used directly in the form described above, e.g. for the Ink Jet process, in which the said dyes are used in known manner to prepare aqueous or non-aqueous colored inks. Highly light-fast and brilliant dye-metal complexes may be obtained, for example, by using a recording carrier containing a layer which is impregnated with a salt of the required heavy metal (Cu or Ni). Information on the Ink Jet process may be found in a lecture on this subject by R. Meyer and K. Hoffmann, Kongressband, 4th International Congress for Reprography and Information, 1975, pages 184–199.

Those dyes indicated above which are used for the dye diffusion transfer process may be diffusible dyes released from the corresponding dye-releasers of formula (III) or model dyes which may be linked by known methods of preparation to releasable carrier groups to form dye-releasers of formula (III) without any deleterious change in the light-fastness or absorption. The dyes according to the invention corresponding to formula (II) are subsequently released image-wise from the dye-releasers of formula (III) in the course of development.

Examples of dye-releasers according to the invention are shown below.

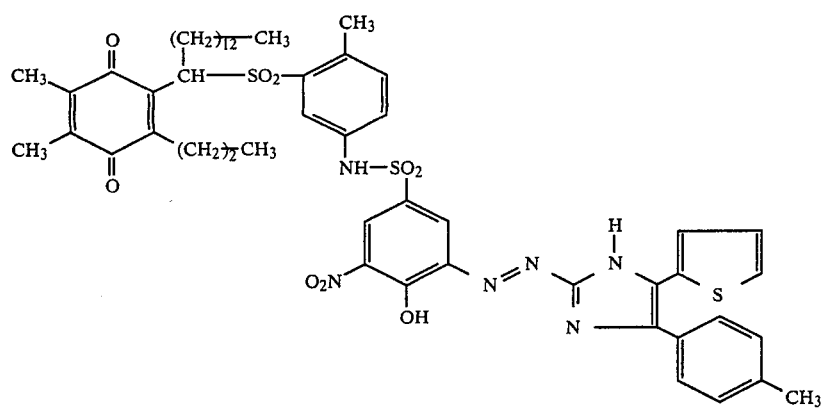
Dye-releaser 1
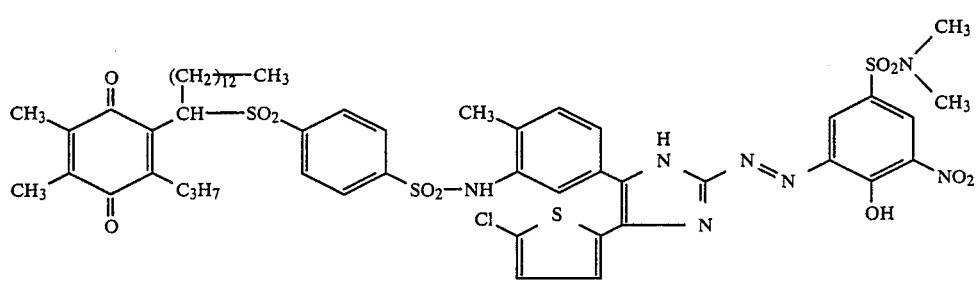
Dye-releaser 2
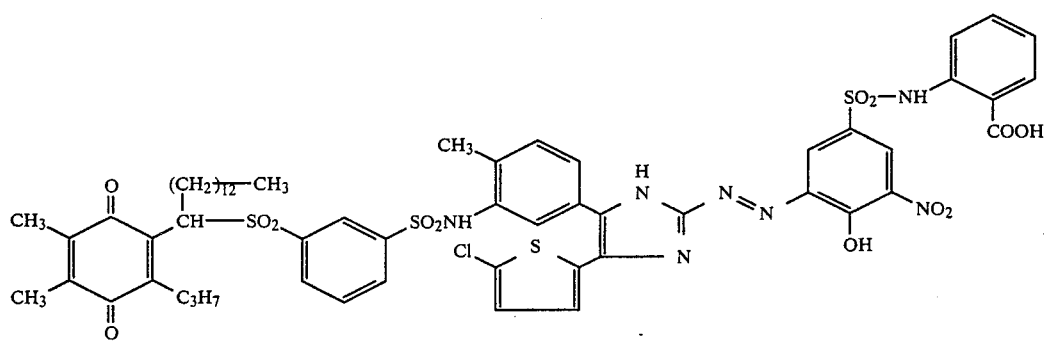
Dye-releaser 3
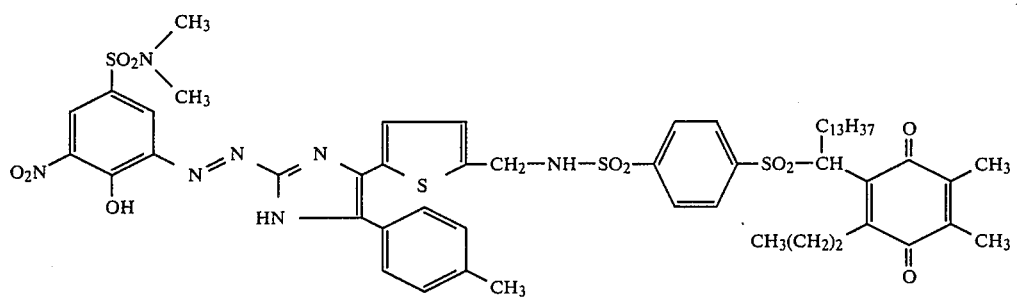
Dye-releaser 4

-continued

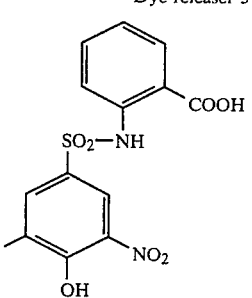
Dye-releaser 5

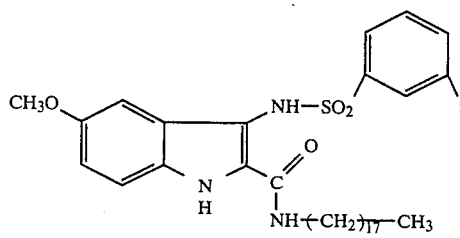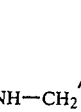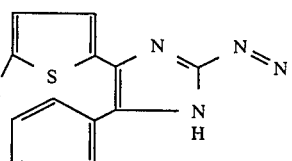

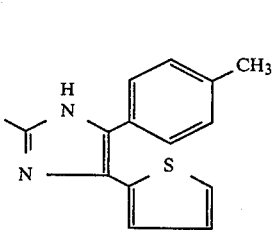
Dye-releaser 6

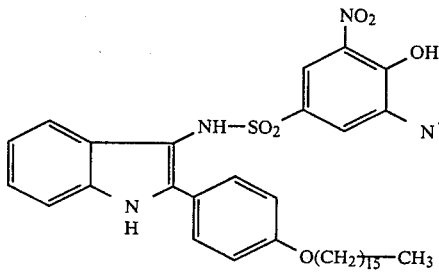

The preparation of dye-releasers (III) according to the invention is described below with the aid of some representative examples.

Preparation of the dye-releaser 2

Precursor 2.1

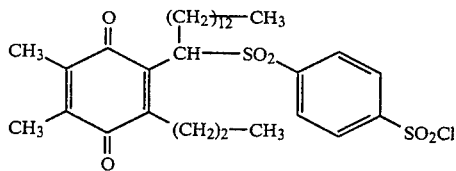

20 g of 2,3-dimethyl-5-propyl-6-[α-(4-aminobenzene-sulfonyl)-tetradecyl]-benzoquinone-(1,4) are diazotized with 2.7 g of sodium nitrite in 100 ml of glacial acetic acid at 15° C. after the addition of 10 ml of concentrated hydrochloric acid. The reaction mixture is treated with 0.5 g of amidosulfonic acid and then introduced at 10° C. into a solution of 35 ml of liquid SO₂ and 1.5 g of copper-II-chloride in 100 ml of glacial acetic acid. The reaction mixture is heated to 20° C. and then stirred for 2 hours.

The solid substance precipitated by the addition of 100 ml of water is suction-filtered, washed until neutral, dried and recrystallized from ethyl acetate/hexane.

Yield: 20 g.

10 ml of pyridine are introduced dropwise at 0° C. into a solution of 8.3 g of precursor 2.1 and 6 g of 4-(5-chloro-2-thienyl)-5-(3-aminotolyl)-imidazole, (prepared from 4-(5-chloro-2-thienyl)-5-p-tolyl imidazole by nitration and reduction) in 200 ml of ethyl acetate. The reaction mixture is kept at room temperature for 2 days and treated with 100 ml of water. The solvent phase is concentrated by evaporation and treated with methanol. The solid substance deposited is recrystallized from isopropanol.

Yield: 5 g.

Dye-releaser 2 (2.3)

1.3 g of 3-amino-4-hydroxy-5-nitrobenzene-sulfonic acid dimethylamide in 30 ml of water and 2 ml of concentrated hydrochloric acid are diazotized at 5°-10° C. with 0.35 g of sodium nitrite in 2 ml of water, stirred for a further 40 minutes at 10° C. and treated with 0.1 g of amidosulphonic acid, and the suspension obtained is poured into a mixture of 4.4 g of precursor 2.2 and 4 g of potassium carbonate and 8 g of water in 200 ml of acetone at 5°-10° C. The mixture is then stirred for 2 hours, during which time the potassium carbonate partly goes into solution. 200 g of ice are added and stirring is continued intil the flocculent precipitate has become capable of being filtered. The product is suc- Precursor 2.2

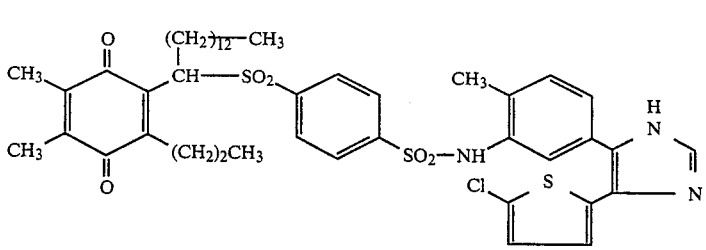

tion-filtered, digested with methanol and reprecipitated with acetonitrile/methanol.

Yield: 2.3 g of a bluish violet powder readily soluble in ethyl acetate.

Dye-releaser 4

Precursor 4.1

4-(5-phthalimidomethyl-2-thienyl)-5-p-tolyl imidazole 375 ml of concentrated $H_2SO_4$ are added dropwise to a solution of 240 g of 4-(2-thienyl)-5-p-tolyl imidazole (1 mol) in 1,000 ml of propionic acid at 0° C., and 265 g (1.5 mol) of N-hydroxymethyl-phthalimide are added portionwise. The reaction mixture is left at 25° C. for 24 hours with stirring and the resulting suspension is poured out onto 400 g of ice. The precipitate obtained is suction filtered, washed with water, taken up with ammonia (10%) and again suction-filtered.

Precursor 4.2

4-(5-aminomethyl-2-thienyl)-5-p-tolyl imidazole (hydrochloride)

The crude product of 4.1 is suspended in 1,000 ml of ethanol, 80 g of hydrazine hydrate are added and the suspension is maintained under reflux for 1 hour. After cooling, the reaction mixture is adjusted to pH 1 with concentrated HCl, the precipitated by-product is removed by suction filtration and the filtrate is concentrated by evaporation. The residue is taken up with ethanol and HCl is passed through it. The precipitated yellowish hydrochloride is suction-filtered and dried.

Precursor 4.3

2-(2-hydroxy-3-nitro-5-dimethyl-sulfamoyl phenyl)-azo-4-(5-aminomethyl-2-thienyl)-5-p-tolyl imidazole . HCl 11.3 g (0.043 mol) of 3-amino-4-hydroxy-5-nitro-benzene-sulfonic acid dimethylamide are dissolved in 50 ml of DMF. A solution of 3.2 g (0.046 mol) of sodium nitrite in 20 ml of water is added and the resulting mixture is introduced into a mixture of 50 g of ice and 30 ml of concentrated HCl.

Stirring is then continued for 45 minutes, excess nitrite is destroyed with 1 g of amidosulphonic acid, and the diazonium salt solution obtained is introduced at 0° C. into a solution of 13.2 g (0.043 mol) of 4.2 in 100 ml of DMF and 50 g of ice with the pH controlled at pH=13. During the coupling reaction, the pH is kept constant by the addition of 10 N sodium hydroxide solution. After 30 minutes, the mixture is poured out onto 300 g of ice, adjusted to pH=3 with HCl and suction-filtered. The dark blue powder obtained is ready for use without further purification.

Yield: 19 g.

Dye-releaser 4 (4.4)

11.6 g (0.02 mol) of 4.3 are dissolved in 70 ml of anhydrous DMF, 6 ml of triethylamine are added, and a solution of 12.25 g (0.02 mol) of quinone sulfochloride 2.1 in 30 ml of anhydrous acetone is added dropwise. The mixture is left to react for 6 hours at 20° C. (the reaction of 4.3 is tested by thin layer chromatography in silica gel, eluent: chloroform + 10% methanol), and the resulting reaction mixture is poured out on 250 g of ice and 20 ml of concentrated hydrochloric acid.

The bluish-black crude product obtained is suction-filtered, dried under vacuum and purified by column chromatography over silica gel, using dichloromethane/methanol and eluent.

12 g of a dark blue powder readily soluble in ethyl acetate are obtained.

For the dye diffusion transfer process, the dye-releasers according to the invention are incorporated in a color photographic recording material in association with a light-sensitive silver halide emulsion layer. A recording material of this kind to be used for a monochromatic process contains at least one light-sensitive silver halide emulsion layer whereas a material of this kind intended for the production of multi-colored images generally contains at least three light-sensitive silver halide emulsion layers differing in their spectral sensitivity and, according to the invention, a dye-releaser corresponding to formula (III) is associated with at least one of these layers. On development, the dye-releasers give rise to diffusible dyes which, after diffusion into an image receptor layer, are converted into cyan image dyes by complex formation with copper ions. The dye-releasers according to the invention are therefore preferably associated with a red-sensitive silver halide emulsion layer.

The terms "association" and "associated" mean that the light-sensitive silver halide emulsion layer and the dye-releaser are so arranged in relation to each other that, when development takes place, they are capable of an interaction with each other whereby the diffusible azo dye which is capable of complex formation with metal ions is released as a function of the development of the silver halide emulsion layer. The light-sensitive silver halide and dye-releasing compound need not necessarily be present in the same layer to enable this interaction to take place but may be situated in adjacent layers, provided these belong to the same layer unit.

Where the dye-releasers according to the invention are reducible compounds which are split up by reduction and preferably used together with ED compounds (or their precursors, e.g. according to DE-A No. 3,006,268), the term "association" means the arrangement of silver halide emulsion, ED compound or ED precursor compound and dye-releaser in relation to each other such that an interaction between them can take place to provide an imagewise correspondence between the silver image produced and the consumption of ED compound on the one hand and between unused ED compound and the dye-releaser on the other hand so that an image-wise distribution of diffusible dye is produced in correspondence with the undeveloped silver halide.

Although various methods may be used for incorporating the dye-releasers according to the invention, it has been found advantageous if these compounds according to the invention are incorporated in the layer in the form of emulsions, using so-called oil formers. This has the advantage, especially when reducible dye-releasers which are split up by reduction are used in combination with ED compounds, that the dye-releasing and ED compound may be brought into very close functional contact with each other in the form of a common emulsion. Suitable oil formers have been described, for example, in U.S. Pat. No. 2,322,027, DE-A No. 1,772,192, DE-A No. 2,042,659 and DE-A No. 2,049,689. The optimum quantities of dye-releaser to be incorporated, optionally together with ED compound, may be determined by simple, routine tests. A dye-releaser according to the present invention may be incorporated, for example, in quantities of from 0.05 to 0.2 mol per mol of silver halide while the ED compound, if used, may be incorporated in quantities of from 0.1 to 0.6 mol per mol of silver halide.

Development of the color photographic recording material according to the invention which has been exposed imagewise is initiated by a treatment with an aqueous-alkaline, optionally highly viscous developer solution. The auxiliary developer compounds required for development to take place may either be present in the developer solution or partly or completely contained in one or more layers of the color photographic recording material according to the invention. When development takes place, diffusible dyes are released image-wise from the dye-releasers and transferred to an image receptor layer which may either be an integral component of the color photographic recording material according to the invention or at least placed in contact with this material during development. The image receptor layer may therefore be arranged either on the same layer support as the light-sensitive element or on a separate layer support. It consists substantially of a binder containing mordants for fixing the diffusible dyes released from the non-diffusible dye-releasers. The mordants used for anionic dyes are preferably long-chained quaternary ammonium or phoshonium compounds, e.g. those described in U.S. Pat Nos. 3,721,147 and 3,271,148. Certain metal salts and their hydroxides which form difficultly soluble compounds with acid dyes may also be used. Mention should also be made of the polymer mordants, such as those described in DE-A No. 2,315,304, DE-A No. 2,631,521 or DE-A No. 2,941,818. The dye mordants are present in the mordant layer in the form of a dispersion in one of the usual hydrophilic binders, e.g. in gelatine, polyvinyl pyrrolidone or partly or completely hydrolysed cellulose esters. Some binders may, of course, also function as mordants, e.g. certain polymers of nitrogen-containing quaternary bases such as 2-methyl-4-vinyl pyridine, 4-vinyl pyridine or 1-vinyl imidazole, as described, for example, in U.S. Pat. No. 2,484,430. Further examples of suitable binders functioning as mordants include guanyl hydrazone derivatives of alkyl vinyl ketone polymers, as described, for example, in U.S. Pat. No. 2,882,156, and guanyl hydrazine derivatives of acryl styrene polymers as described, for example, in DE-A No. 2,009,498, but the last mentioned mordanting binders would generally be used in combination with other binders, e.g. gelatine.

In the present case, the image receptor layer or a layer adjacent thereto may in addition contain heavy metal ions, in particular copper ions, which react with the tridentate azo dyes according to the invention diffusing into the layer to form the corresponding azo dye-metal complexes which have the above-mentioned advantageous properties as regards absorption and stability. The metal ions present in the image receptor layer may be bound in complex form, e.g. bound to certain polymers, as described in Reaseach Disclosure No. 18,534 (September 1979) or in DE-A No. 3,002,287 and DE-A No. 3,105,777. Alternatively, the azo dye-metal complexes may be produced after diffusion of the dyes into the image receptor layer by treating the image receptor layer, containing the resulting image-wise distribution of the dyes according to the invention, with a solution of a salt of one of the above-mentioned heavy metals. The dye-releasers of formula (III) left behind in image-wise distribution (as a negative of the transferred image) in association with the originally light-sensitive layers may also be converted into the corresponding azo dye-metal complexes ("retained image") by a treatment with heavy metal ions. In either case, the color image produced in the color photographic material according to the invention consists of an image-wise distribution of metal complexes, in particular copper complexes, of the dye-releasers according to the invention corresponding to formula (III) or of the azo dyes of formula (II) released from them, and in some cases also of additional dyes fixed in the image receptor layer by means of the mordants contained therein.

If the image receptor layer is left in contact with the light-sensitive element after development has been completed, an alkali-permeable, light-reflective layer of binder containing pigment is generally situated between the image receptor layer and the light-sensitive element to serve as an optical separation between the negative and positive and as an aesthetically attractive image background for the transferred color image. Such a light reflective layer may, as is known, either be preformed in the light-sensitive color photographic recording material or produced in the course of development. If the image receptor layer is situated between the layer support and the light-sensitive element and is separated from the light-sensitive element by a preformed, light-reflective layer, then it is necessary either to use a transparent layer support so that the transferred colour image produced can be seen through it, or to remove the light-sensitive element together with the light reflective layer in order to reveal the image receptor layer. However, the image receptor layer may be arranged as the upper most layer in an integral colour photographic recording material in which case exposure may suitably be carried out through the transparent layer support.

EXAMPLE 1

Dyes according to the invention are compared in their spectral data with corresponding 4,5-diphenyl-imidazole azo dyes according to DE-A No. 3,107,540. The Table given below shows for each dye the absorption maximum wave length ($\lambda_{max}$) and, based on the main absorption, the percentage yellow subsidiary density ($SD_{yl}$) and magenta side density ($SD_{mg}$) of the copper-II complexes.

Image receptor sheet 1

An image receptor sheet was prepared by applying the layers indicated below to a paper support which was polyethylene-coated on both sides and carried a layer of adhesive. The figures are based on 1m².
1. A mordant layer containing 6 g of a polyurethane according to Example 3 of DE-A No. 2,631,521 and 5 g of gelatine,
2. A hardening layer containing 0.1 g of gelatine and 0.15 g of instant hardener corresponding to the following formula:

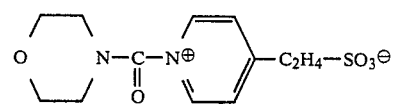

One strip of each image receptor material obtained was dipped into a 0.03 molar dye solution which had been made alkaline with 2% sodium hydroxide, and the strip was colored to a density of 1.2–1.5 (determined on a reflection densitometer RD 514/Macbeth behind a red filter).

The dyes used are indicated in the following Table.

After the immersion treatment, the samples were rinsed with demineralized water and metallized by immersion in a 2% copper acetate solution.

TABLE

| Dye | $\lambda_{max}$ (nm) | $SD_{yl}$ (%) | $SD_{mg}$ (%) |
|-----|------|------|------|
| 2 | — | 26 | 38 |
| 11 | 640 | 30.4 | 44 |
| 28 | 636 | 22.5 | 42 |
| 32 | 630 | 21 | 39 |
| 42 | 650 | 23.2 | 38.3 |
| 44 | 638 | 18 | 39 |
| 51 | 648 | 20.5 | 36 |
| A | 649 | 42 | 50 |
| B | 614 | 28.6 | 44 |
| C | 668 | 32 | 45 |
| D | 624 | 24 | 49 |

The Table clearly shows the superiority of the dyes according to the invention as regards the shade of cyan of the copper-II complexes.

The following comparison dyes were tested:

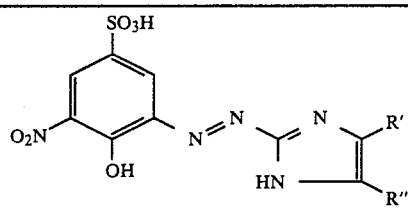

| Dye | R' | R'' |
|-----|----|----|
| A | -⟨⟩-OCH₃ | -⟨⟩-OCH₃ |
| B | -⟨⟩ (OCH₃ meta) | -⟨⟩ (OCH₃ meta) |
| C | -⟨⟩-N(CH₃)₂ | -⟨⟩ |
| D | -⟨⟩ | -⟨⟩ |

Dye C is described as Dye 26 in DE-A No. 3,107,540.

EXAMPLE 2

One strip of image receptor sheet 1 described in Example 1 was immersed in a 0.03 molar dye solution which had been made alkaline with a 2% sodium hydroxide solution, and the strip was colored to a density of 1.2 to 1.5 (determined on a reflection densitometer RD 514/Macbeth behind a red filter).

The dyes shown in the following Table were used.

After the immersion treatment had been completed, the samples were rinsed with demineralized water and metallized by immersion in a 2% nickel acetate solution or a 2% copper acetate solution.

All samples were then rinsed under running water, aftertreated with a 2% succinic acid buffer solution (pH 6) and dried.

The various color strips were each half covered and exposed to xenon light ($4.8 \times 10^6$ lux hours). The percentage decrease in density ($\Delta D/D_o$) is shown in the following Table.

TABLE

| Dye | $\frac{\Delta D}{D_o}$ (Cu) | $\frac{\Delta D}{D_o}$ (Ni) |
|-----|------|------|
| 23 | −16 | −22 |
| 24 | −12 | −15 |
| 26 | −7 | −10 |
| 31 | −17 | −21 |
| 35 | −18 | |
| 42 | −10 | |
| 44 | −13 | |
| 45 | −8 | |
| 47 | −9 | |
| 48 | −19 | |
| 49 | −13 | −12 |
| 50 | −7 | −12 |
| 51 | −12 | −4 |
| 52 | −17 | −9 |
| 53 | −7 | −10 |
| 54 | −11 | −11 |
| 57 | −9 | −7 |
| 63 | −1 | −9 |
| 64 | −6 | −9 |

EXAMPLE 3

Light-sensitive Element 1 (not according to the invention)

The following layers were applied in succession to a paper support which had been coated with polyethylene on both sides. All figures given are based on 1 m².

1. A red-sensitized silver iodobromide emulsion layer obtained from 0.5 g of AgNO₃ and containing 0.3 g of dye-releaser F which is not according to the invention (=compound 2 of DE-A No. 2,854,946), 0.16 g of ED compound ED 6 (=compound 4 of DE-A No. 3,006,268), 0.46 g of palmitic acid diethylamide and 1.15 g of gelatine.

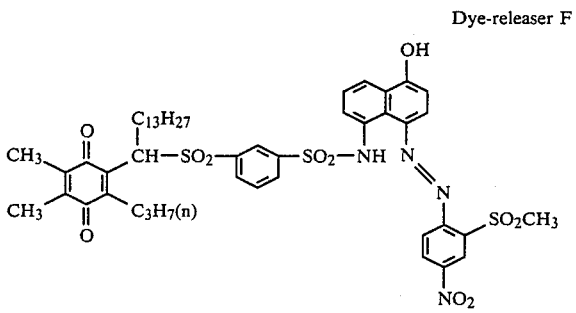

Dye-releaser F

2. A protective layer containing 0.6 g of the monoacetylation product of 4-methyl-4-hydroxymethyl phenidone, 0.12 g of 2-isooctadecyl-5-sulfo-hydroquinone and 0.6 g of gelatine.

3. A hardening layer containing 0.1 g of gelatine and 0.12 g of instant hardener corresponding to the formula:

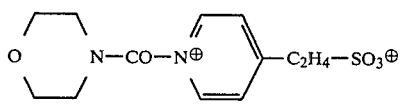

After light-sensitive Element 1 had been exposed image-wise through a step wedge, this element and an image receptor sheet as described in Example 2 were impregnated with a treatment solution having the composition indicated below and then pressed together with their active surfaces in contact:
925 g H₂O
30 g isobutanol
2 g Na₂SO₃
3 g KBr
40 g KOH.

After a contact time of 2 minutes, the sheets were separated and the image receptor sheet was bathed in water for 30 seconds. After drying, the Dmin/Dmax values of the positive cyan color image 1 were measured.

Light sensitive Element 2 (according to the invention)
Light-sensitive element 2 differs from light-sensitive element 1 in that its layer 1 has the following composition.

1. A red-sensitized silver iodobromide emulsion obtained from 1.0 g of AgNO₃ and containing 0.63 g dye-releaser 4, 0.38 g of ED compound ED 6, 0.6 g of palmitic acid diethylamine and 2.0 g of gelatine.

This light-sensitive element was processed by a method similar to that used for light-sensitive element 1 but with a contact time of 7 minutes. After separation, the material was briefly rinsed with demineralized water, metallized by immersion in a 2% copper-II acetate solution, again rinsed and dried.

The results obtained from light-sensitive elements 1 and 2 ( color images 1 and 2) are compared below.

| Color image | Dye-releaser | $D_{min}$ | $D_{max}$ | S | $\frac{\Delta D}{D_o}$ |
|---|---|---|---|---|---|
| 1 | F | 0.18 | 2.8 | 100 | −80%* |
| 2 | 4 | 0.12 | 2.0 | 64 | −11%* |
|   |   |   |   |   | −20%** |

The sensitivity S is given in column 5 in relative log I.t units.
The percentage density loss on exposure to xenon light is given in column 6:
*−4.8 × 10⁶ lux hours
**−7.2 × 10⁶ lux hours.

Light-sensitive element 2 gives rise to a cyan color image having a stability to light which is improved by a factor of at least 7 compared with that of conventional cyan monoazo dye images.

We claim:
1. A color photographic recording material for the production of color images by the dye diffusion transfer process, containing, associated with at least one light-sensitive silver halide emulsion layer, a non-diffusible, color-providing compound from which a diffusible azo dye capable of forming complexes with metal ions is released under alkaline development conditions as a function of the development of the silver halide emulsion layer, wherein the improvement comprises the azo dyes corresponds to the following formula (II):

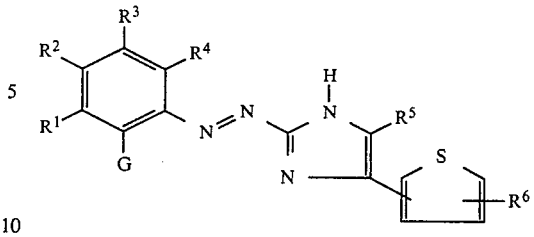

wherein
R¹, R², R³ and R⁴, which may be identical or different, represent H, F, Cl, Br, —CN, —NO₂, —CF₃, —OCF₃, —SCF₃, alkyl, alkoxy, alkylthio, acylamino, alkylsulfonyl, arylsulfonyl, —CO—X or —SO₂—Y; or R³ and R⁴ together represent a group for completing a 1,3-oxathiol-S,S-dioxide ring;
R⁵ represents aryl or a 2-thienyl or 3-thienyl group;
R⁶ represents hydrogen, halogen or alkyl;
G represents a group capable of forming a 5-membered chelate ring;
X represents —OH, alkoxy, an amino group optionally substituted by alkyl or aryl, or a cyclic amino group;
Y represents H, —OH, an amino group optionally substituted by alkyl or aryl, a cyclic amino group or a group corresponding to the formula —NH—SO₂—R⁷, and
R⁷ represents alkyl, aryl, an amino group optionally disubstituted by alkyl, or a cyclic amino group.

2. The method of producing a light-stable cyan image by dye diffusion processing of an imagewise exposed color photographic recording material containing, associated with at least one light-sensitive silver halide emulsion layer, a non-diffusible color providing compound while in contact with a supported image receptor layer,
the method comprising the step of releasing from said non-diffusible color providing compound under alkaline development conditions a diffusible azo dye corresponding to the following formula

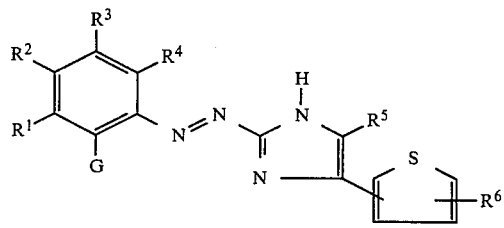

wherein
R¹, R², R³ and R⁴, which may be identical or different, represent H, F, Cl, Br, —CN, —NO₂, —CF₃, —OCF₃, —SCF₃, alkyl, alkoxy, alkylthio, acylamino, alkylsulfonyl, arylsulfonyl, —CO—X or —SO₂—Y; or R³ and R⁴ together represent a group for completing a 1,3-oxathiol-S,S-dioxide ring;
R⁵ represents aryl or a 2-thienyl or 3-thienyl group;
R⁶ represents hydrogen, halogen or alkyl;
G represents a group capable of forming a 5-membered chelate ring;
X represents —OH, alkoxy, an amino group optionally substituted by alkyl or aryl, or a cyclic amino group;
Y represents H, —OH, an amino group optionally substituted by alkyl or aryl, a cyclic amino group or a group corresponding to the formula —NH—SO₂—R⁷, and
R⁷ represents alkyl, aryl, an amino group optionally substituted by alkyl, or a cyclic amino group and transferring at least part of said released azo dye to said image receptor layer and forming complexes with metal ions.

* * * * *